US006874806B1

(12) United States Patent
Blake

(10) Patent No.: US 6,874,806 B1
(45) Date of Patent: Apr. 5, 2005

(54) TRAILER HITCH COVER ASSEMBLY

(75) Inventor: Robert B. Blake, Ferndale, MI (US)

(73) Assignee: Blake Design Group, LLC., Troy, MI (US)

( * ) Notice: Subject to any disclaimer, the term of this patent is extended or adjusted under 35 U.S.C. 154(b) by 0 days.

(21) Appl. No.: 10/628,638

(22) Filed: Jul. 28, 2003

Related U.S. Application Data

(60) Provisional application No. 60/399,285, filed on Jul. 29, 2002.

(51) Int. Cl.[7] .................................................. B60D 1/60
(52) U.S. Cl. ...................................... 280/507; 150/166
(58) Field of Search ................................ 280/507, 504, 280/432, 500–502; 150/166; 293/142

(56) References Cited

U.S. PATENT DOCUMENTS

| | | |
|---|---|---|
| 2,035,486 A | 3/1936 | Larson |
| 2,080,161 A | 5/1937 | Berggren |
| 2,571,349 A | 10/1951 | Eckles |
| D192,684 S | 5/1962 | Knowles |
| 3,058,757 A | 10/1962 | Sullivan |
| 3,095,058 A | 6/1963 | Woytowich |
| 3,578,358 A | 5/1971 | Reynolds |
| 3,613,044 A | 10/1971 | Rarick |
| 3,716,254 A | 2/1973 | Tarvin |
| 3,746,366 A | 7/1973 | Bruce et al. |
| 3,884,055 A | 5/1975 | Vuillemot |
| 4,040,641 A | 8/1977 | Riecke |
| 4,073,508 A | 2/1978 | George et al. |
| 4,138,130 A | 2/1979 | Pickrell et al. |
| 4,141,569 A | 2/1979 | Dilk |
| 4,196,918 A | 4/1980 | Strader |
| 4,256,324 A | 3/1981 | Hamilton |
| 4,319,764 A | 3/1982 | Whitaker |
| 4,538,827 A | 9/1985 | Plifka |
| 4,540,194 A | 9/1985 | Dane |
| 4,570,986 A * | 2/1986 | Sams ......................... 293/117 |
| 4,730,841 A | 3/1988 | Ponder |
| 4,778,196 A | 10/1988 | Spoliansky |
| 4,784,610 A | 11/1988 | Stuart |
| 4,798,409 A | 1/1989 | Miller |
| 4,893,856 A | 1/1990 | Council |
| 4,928,993 A | 5/1990 | Appavoo |
| 4,966,378 A | 10/1990 | Cook |
| 5,011,176 A | 4/1991 | Eppinette |
| 5,121,944 A | 6/1992 | Haddox |
| 5,330,084 A | 7/1994 | Peters |

(Continued)

FOREIGN PATENT DOCUMENTS

EP          0 491 241 B1       12/1994

(Continued)

*Primary Examiner*—Avraham Lerner
(74) *Attorney, Agent, or Firm*—Bliss McGlynn, P.C.

(57) ABSTRACT

A trailer hitch cover assembly includes a bumper fascia for attachment to a motor vehicle having an aperture for allowing a hitch tube to extend therethrough. The trailer hitch cover assembly also includes a main body adapted to be disposed over the hitch tube and adapted to allow insertion of a hitch into the hitch tube. The trailer hitch cover assembly further includes a cover plate hingedly connected to either one of the main body and the bumper fascia for moving between a closed position to close the aperture to conceal the hitch tube and an open position to open the aperture to expose the hitch tube.

20 Claims, 5 Drawing Sheets

U.S. PATENT DOCUMENTS

| | | |
|---|---|---|
| 5,421,601 A | 6/1995 | Hinze et al. |
| 5,503,423 A | 4/1996 | Roberts et al. |
| 5,560,631 A | 10/1996 | Salvo |
| 5,593,170 A | 1/1997 | Chiu |
| 5,603,178 A | 2/1997 | Morrison |
| 5,628,536 A * | 5/1997 | Fulkerson .................. 293/117 |
| 5,722,854 A | 3/1998 | Geisler |
| 5,800,188 A | 9/1998 | Barber et al. |
| 5,934,699 A | 8/1999 | Blake |
| 5,992,871 A | 11/1999 | Rowland et al. |
| 6,007,033 A | 12/1999 | Casson et al. |
| 6,019,386 A | 2/2000 | Morelock |
| 6,079,136 A | 6/2000 | Kozlarek |
| 6,082,753 A | 7/2000 | Kotlier |
| 6,095,546 A | 8/2000 | Austin |
| 6,145,865 A | 11/2000 | Cannara et al. |
| 6,149,181 A | 11/2000 | Biederman |
| 6,164,680 A | 12/2000 | Kluhsman |
| 6,176,506 B1 | 1/2001 | Blake |
| 6,189,910 B1 | 2/2001 | Bartel |
| 6,199,892 B1 | 3/2001 | Dahl |
| 6,209,898 B1 | 4/2001 | Fortier et al. |
| 6,247,257 B1 | 6/2001 | Powell |
| 6,260,874 B1 | 7/2001 | Smith et al. |
| D458,195 S | 6/2002 | Beauvais |
| 6,409,203 B1 | 6/2002 | Williams |
| 6,428,031 B1 * | 8/2002 | McCoy et al. .............. 280/495 |
| 6,439,595 B1 | 8/2002 | Cheng et al. |
| 2004/0046360 A1 * | 3/2004 | Bagley ....................... 280/507 |

FOREIGN PATENT DOCUMENTS

JP              1-267191        10/1989

* cited by examiner

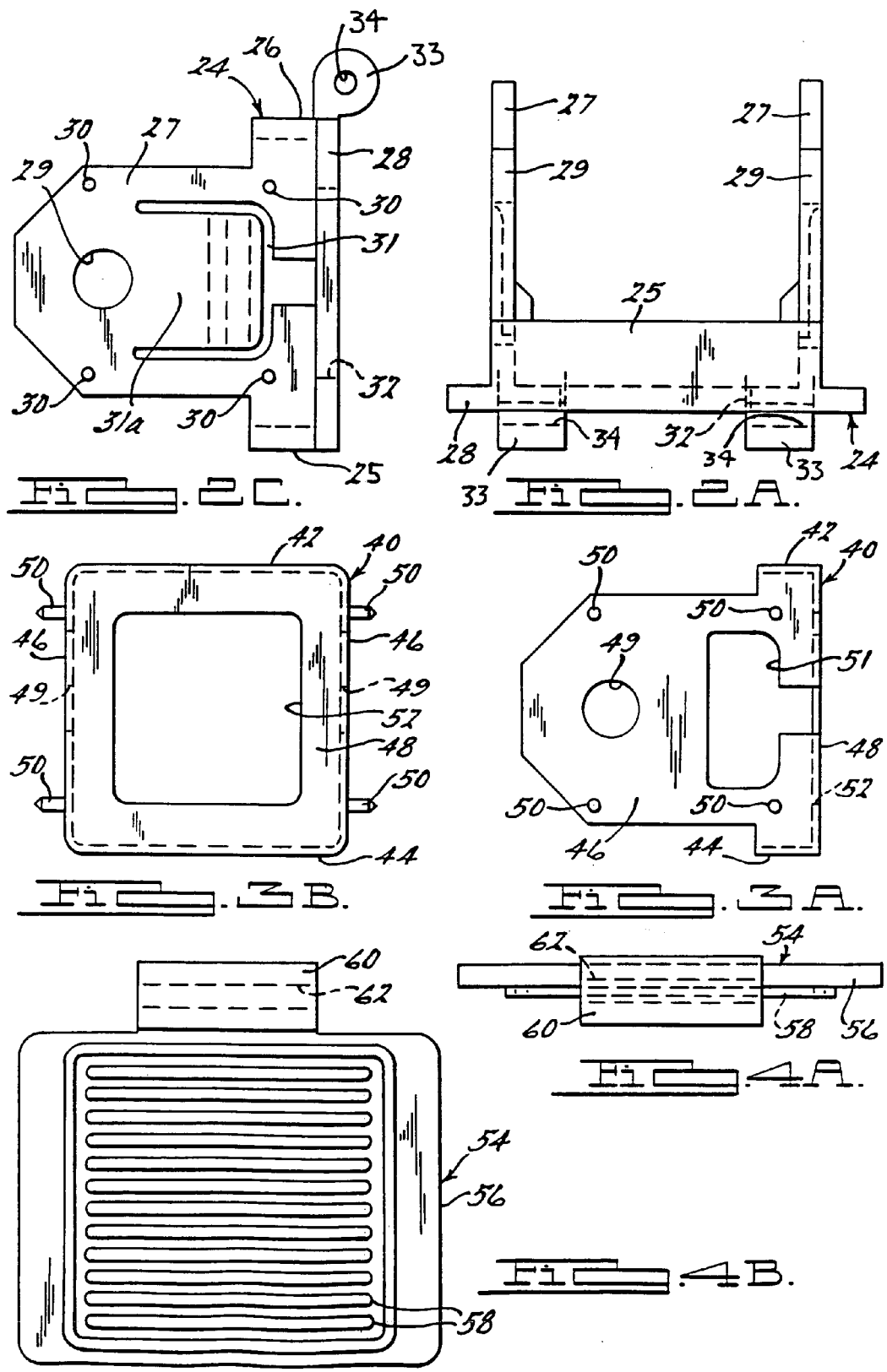

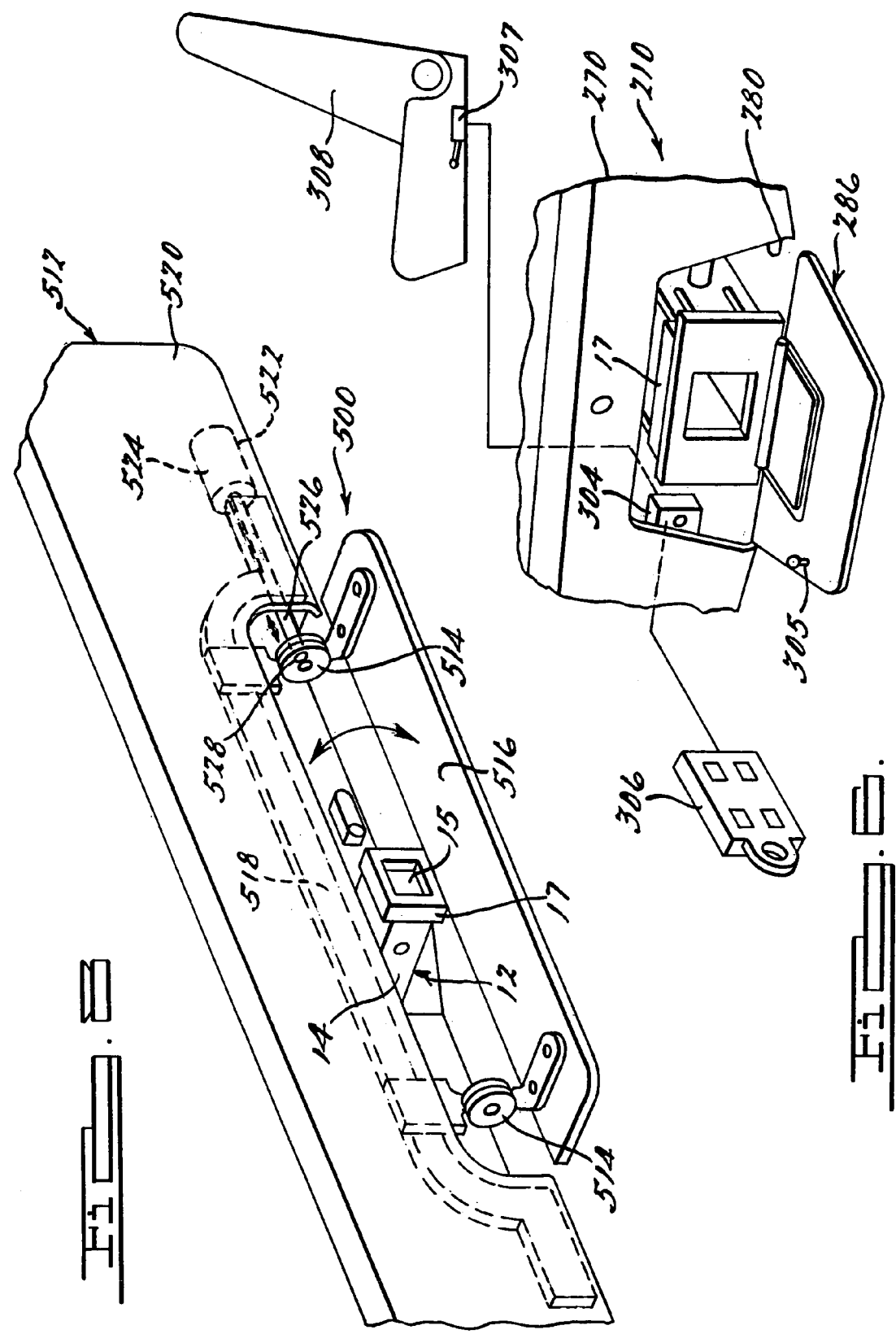

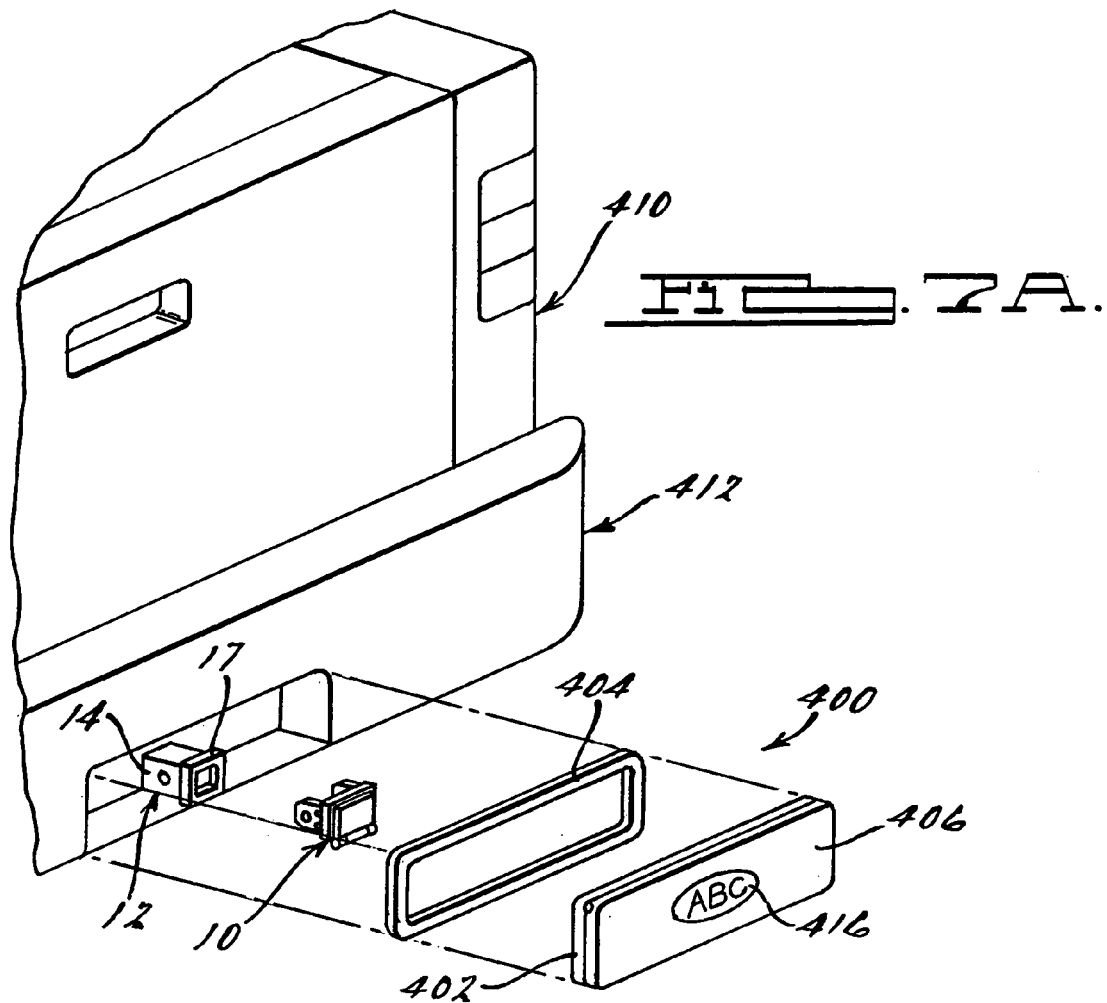
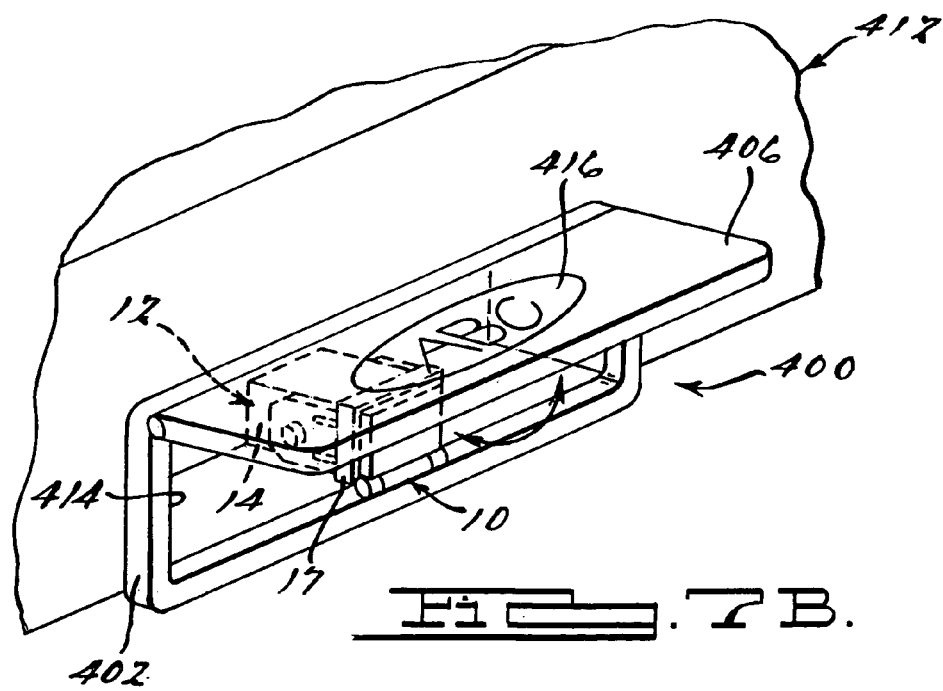

TRAILER HITCH COVER ASSEMBLY

CROSS-REFERENCE TO RELATED APPLICATION(S)

The present invention claims the priority date of copending U.S. Provisional Patent Application Ser. No. 60/399,285, filed Jul. 29, 2002.

BACKGROUND OF THE INVENTION

1. Field of the Invention

The present invention relates generally to motor vehicles and, more particularly, to a trailer hitch cover assembly for a motor vehicle.

2. Description of the Related Art

It is known that motor vehicles may be provided with a trailer hitch to pull a trailer. Typically, the motor vehicle has a trailer hitch having a hitch tube secured to the motor vehicle beneath the bumper and a ball connector having an insert tube disposed in the hitch tube. A locking pin extends through the tubes to secure the insert tube to the hitch tube. The trailer generally includes a tongue beam, which is releasibly attached to the ball connector as is known in the art.

Of concern in the use of the trailer hitch is the strength and cleanliness of the hitch tube. Typically, the trailer hitch, whether it is a ball or other type of attachment, has the insert tube and ball connector removed from the hitch tube and stored separately. This protects the ball connector and insert tube from corrosion and exposure to the atmosphere but leaves the hitch tube open to the same. The hitch tube, although constructed of metal and painted, being constantly exposed to the elements, will typically rust not only externally, but also within the interior of the hitch tube. Additionally, the hitch tube has a tendency to collect mud and dirt from either off-road use or just daily driving. The result is that the hitch tube will have a build up of dirt and rust that will not only impair the insertion of the insert tube but also will ultimately weaken the entire hitch. Accordingly, there is a need in the art to protect the hitch tube by covering the opening of the hitch tube.

There do exist "hitch covers" that are inserted into the end of the hitch tube to offer some protection, but they have certain drawbacks. These types of hitch covers often have more of a decorative purpose than one of protection for the hitch tube and they must be fully removed when the hitch is in use, thereby making them easy to misplace or lose. These types of hitch covers are also of a simple slide-in attachment and are susceptible to falling off or out during motor vehicle use without the driver's knowledge, returning to the original problem of exposing the hitch tube to the elements. Quite often these conventional decorative hitch covers have some sort of socially desirable design, such as a sports team emblem or the logo of the vehicle manufacturer, which make them targets of thieves, which again, if stolen, leaves the hitch tube exposed.

Recently, vehicle manufactures have produced vehicles with the hitch tube extending through the bumper beam. The bumper beam is typically covered with a bumper fascia and an aperture is made in the bumper fascia surrounding the hitch tube to expose the hitch tube. As such, the hitch tube is exposed to the elements and the aperture in the bumper beam is unsightly and undesired.

SUMMARY OF THE INVENTION

It is, therefore, one object of the present invention to provide a new trailer hitch cover assembly for a motor vehicle.

It is another object of the present invention to provide a trailer hitch cover assembly that covers an open end of a hitch tube.

It is yet another object of the present invention to provide a trailer hitch cover assembly that covers an open end of a hitch tube, which remains secured to the hitch tube while still providing access to an interior of the hitch tube.

It is still another object of the present invention to provide a trailer hitch cover assembly that cooperates with a bumper fascia of a motor vehicle and covers the open end of a hitch tube when not in use, yet opens to provide access to the interior of the hitch tube as necessary.

To achieve the foregoing objects, the present invention is a trailer hitch cover assembly including a bumper fascia for attachment to a motor vehicle having an aperture for allowing a hitch tube to extend therethrough. The trailer hitch cover assembly also includes a main body adapted to be disposed over the hitch tube and adapted to allow insertion of a hitch into the hitch tube. The trailer hitch cover assembly further includes a cover plate hingedly connected to either one of the main body and the bumper fascia for moving between a closed position to close the aperture to conceal the hitch tube and an open position to open the aperture to expose the hitch tube.

One advantage of the present invention is that a trailer hitch cover assembly is provided for a motor vehicle. Another advantage of the present invention is that the trailer hitch cover assembly provides a hinged cover that may be both readily opened for allowing access to the hitch tube and may be closed to prevent access to the hitch tube. Yet another advantage of the present invention is that the trailer hitch cover assembly prevents contaminants such as dirt and rust from collecting within the hitch tube when not in use, yet the cover may be swung open to provide easy access. Still another advantage of the present invention is that the trailer hitch cover assembly includes a trim module assembly that cooperates with a portion of a bumper fascia of the motor vehicle, which provides a finished, clean aesthetic appearance to the motor vehicle. A further advantage of the present invention is that the trailer hitch cover assembly provides a weather-tight, lockable access cover when in a closed position and provides a secure footing area as a step for operator access to the motor vehicle when opened.

Other objects, features, and advantages of the present invention will be readily appreciated, as the same becomes better understood, after reading the subsequent description when considered in connection with the accompanying drawings.

BRIEF DESCRIPTION OF THE DRAWINGS

FIG. 2A is a plan view of a main body of the trailer hitch cover assembly of FIG. 1B;

FIG. 2C is a side elevational view of the main body of the trailer hitch cover assembly of FIG. 1B;

FIG. 3A is a side elevational view of an insulating member of the trailer hitch cover assembly of FIG. 1B;

FIG. 3B is a front elevational view of the insulating member of the trailer hitch cover assembly of FIG. 1B;

FIG. 4A is a bottom plan view of a cover plate of the trailer hitch cover assembly of FIG. 1B;

FIG. 4B is a rear elevational view of the cover plate of the trailer hitch cover assembly of FIG. 1B;

FIG. 6 is a perspective view of yet another embodiment, according to the present invention, of a trailer hitch cover assembly illustrated in operational relationship with a conventional hitch tube and bumper fascia of a motor vehicle;

FIG. 7A is an exploded perspective view of still another embodiment, according to the present invention, of a trailer hitch cover assembly illustrated in operational relationship with a conventional hitch tube and bumper fascia of a motor vehicle;

FIG. 7B is a perspective view of the trailer hitch cover assembly of FIG. 7A illustrated with a cover in an open position; and FIG. 8 is a perspective view of a further embodiment, according to the present invention, of a trailer hitch cover assembly illustrated with a cover in an open position and in operational relationship with a conventional hitch tube and bumper fascia of a motor-vehicle.

DESCRIPTION OF THE PREFERRED EMBODIMENT(S)

Figure 1A:
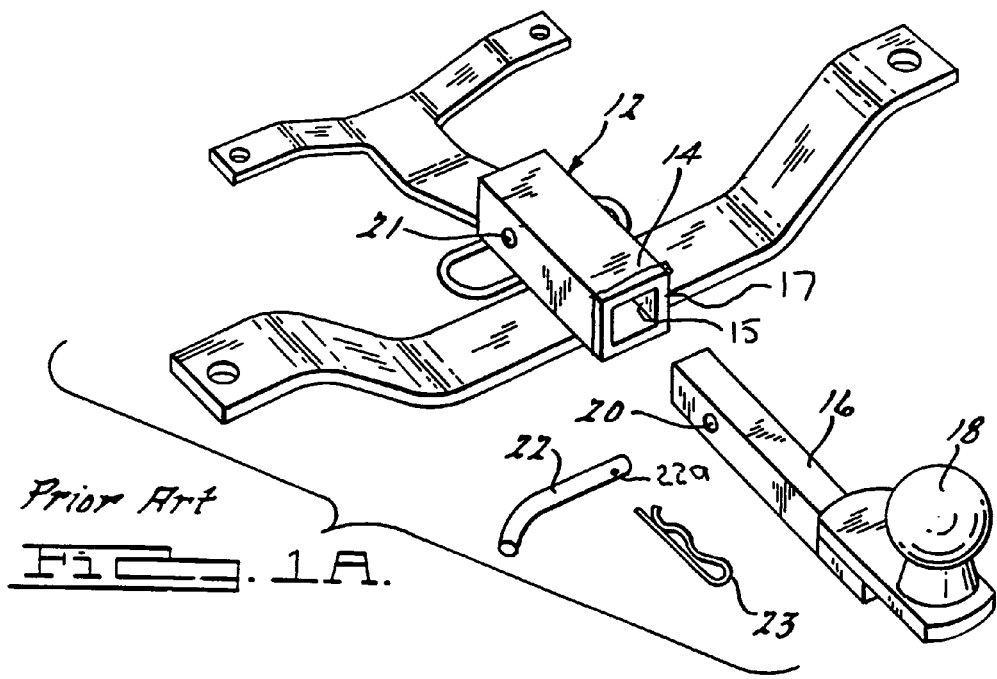
FIG. 1A is a perspective view of a conventional trailer hitch assembly.
Figure 1B:
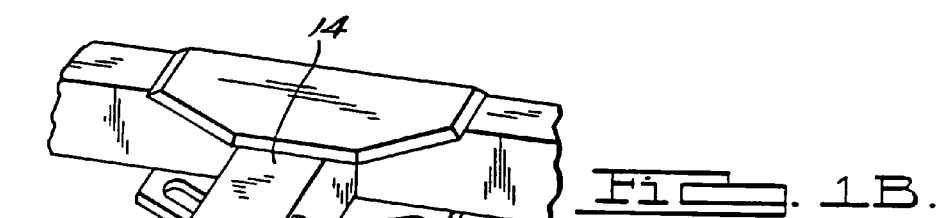
FIG. 1B is a perspective view of a trailer hitch cover assembly, according to the present invention, illustrated in operational relationship with a conventional hitch tube of the trailer hitch assembly.

Referring to the drawings and in particular FIG. 1B, one embodiment of a trailer hitch cover assembly 10, according to the present invention, is shown. As illustrated in FIG. 1A, a trailer hitch assembly, generally indicated at 12, is shown for a motor vehicle (not shown). The motor vehicle may be of a pick-up truck type known in the art although any type of motor vehicle may be used in connection with the trailer hitch cover assembly 10. The trailer hitch assembly 12 includes a hitch tube 14 located beneath a bumper (not shown), preferably a rear bumper, of the motor vehicle. The hitch tube 14 extends longitudinally. The hitch tube 14 has a generally rectangular cross-sectional shape. The hitch tube 14 has a cavity extending longitudinally therein and a flange 17 around the open end of the cavity 15. The hitch tube 14 has a lock-pin aperture 21 extending laterally therethrough for a function to be described. It should be appreciated that the hitch tube 14 may have any suitable cross-sectional shape. It should also be appreciated that the hitch tube 14 is conventional and known in the art.

The trailer hitch assembly 12 also includes an insert tube 16 having a ball connector 18. The insert tube 16 extends longitudinally and has a generally rectangular cross-sectional shape to be received in the hitch tube 14. The insert tube 16 has a lock-pin aperture 20 extending laterally therethrough. When the insert tube 16 is inserted in the cavity 15 of the hitch tube 14, it is inserted so that the lockpin aperture 20 on the insert tube 16 aligns with the lockpin aperture 21 extending through the hitch tube 14. It should be appreciated that the insert tube 16 may have any suitable cross-sectional shape to be received within the hitch tube 14. It should also be appreciated that the insert tube 16 and ball connector 18 are conventional and known in the art.

The trailer hitch assembly 12 further includes a lockpin 22 to be inserted through the lockpin aperture 20 and lockpin aperture 21 to prevent the insert tube 16 from exiting the hitch tube 14. The lockpin 22 is generally cylindrical in shape with a generally circular cross-sectional shape. The lockpin 22 typically has one end that is bent to form a general "L" shape and the other end has an aperture 22a extending diametrically therethrough. The trailer hitch assembly 12 also includes a hairpin clip 23 which is inserted through the aperture 22a in the lockpin 22 and clipped on the end of the lockpin 22 to prevent the lockpin 22 from exiting the hitch tube 14 and insert tube 16. It should be appreciated that the lockpin 22 and hairpin clip 23 are conventional and known in the art.

Referring to FIG. 1B, the trailer hitch cover assembly 10, according to the present invention, is disposed or fits over the hitch tube 14 and is retained upon the hitch tube 14 as will be described. It should be appreciated that, except for the trailer hitch cover assembly 10, the trailer hitch assembly 12 is conventional and known in the art.

Figure 2B:
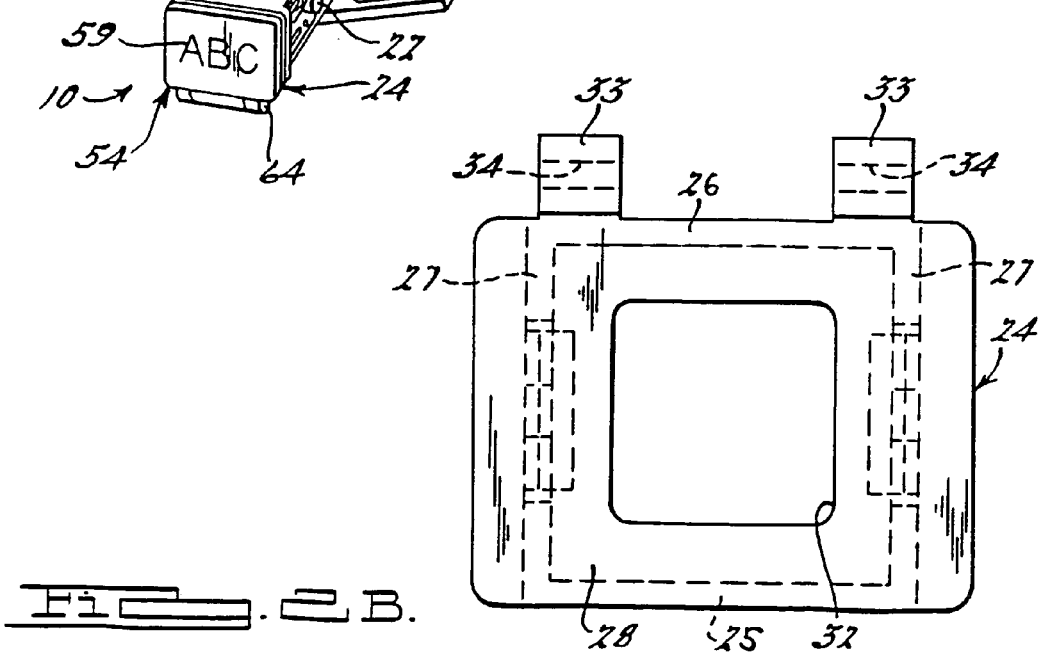
FIG. 2B is a front elevational view of the main body of the trailer hitch cover assembly of FIG. 1B.

Referring to FIGS. 2A through 2C, the trailer hitch cover assembly 10, according to the present invention, includes a main body, generally indicated at 24, for connection to the hitch tube 14 of the trailer hitch 12. The main body 24 has a generally rectangular shape defined by a top wall 25, a bottom wall 26, opposed sidewalls 27, and a front wall 28. The side walls 27 extend longitudinally and include an aperture 29 extending laterally therethrough to receive and allow the lockpin 22 of the trailer hitch assembly 12 to secure the main body 24 to the hitch tube 14. The sidewalls 27 may also include a plurality of apertures 30 extending therethrough for a function to be described. The sidewalls 27 include a slot 31 having a generally inverted "U" shape to form tabs 31a for a function to be described. The front wall 28 is generally rectangular in shape and has an aperture 32 extending longitudinally therethrough to allow the insert tube 16 to extend therethrough and be disposed within the hitch tube 14. The aperture 32 is generally rectangular in shape. The front wall 28 also has a pair of transversely spaced flanges or hinge knuckles 33 extending outwardly and forwardly from the bottom wall 26. Each of the hinge knuckles 33 has an aperture 34 extending therethrough for a function to be described. The main body 24 is made of a rigid material such as metal, plastic, or a metal with a plastic overlay. It should be appreciated that the main body 24 fits over the open end of the hitch tube 14 as illustrated in FIG. 1B.

Referring to FIGS. 3A and 3B, the trailer hitch cover assembly 10 also includes an insulating member, generally indicated at 40, cooperating with the main body 24. The insulating member 40 is of a gasket type and constructed of a thin flexible material, such as a rubberized compound and is cooperatively fitted within the inside of the main body 24 before the main body 24 is attached to the hitch tube 14. The insulating member 40 has a generally rectangular shape defined by a top wall 42, a bottom wall 44, opposed sidewalls 46, and a front wall 48. The side walls 46 extend longitudinally and include an aperture 49 extending laterally therethrough to receive and allow the lockpin 22 of the trailer hitch assembly 12 to extend therethrough and secure the insulating member 40 to the hitch tube 14. The sidewalls 46 also include a plurality of pins 50 extending outwardly to be received in the apertures 30 of the main body 24 to secure the insulating member 40 to the main body 24. The sidewalls 46 include an opening 51 extending laterally therethrough to allow the tabs 31a of the main body 24 to be accessed by a tool (not shown). The front wall 48 is generally rectangular in shape and has an aperture 52 extending longitudinally therethrough to allow the insert tube 16 to be extend therethrough and be disposed within the hitch tube 14. The aperture 52 is generally rectangular in shape. It should be appreciated that the insulating member 40 is disposed within the main body 24 and the pins 50 are inserted into and pulled through the apertures 30 in the main body 24 to retain and properly orient the insulating member 40 within the main body 24.

Referring to FIGS. 4A and 4B, the trailer hitch cover assembly 10 further includes a rotatable door or cover, generally indicated at 54. The cover 54 has a plate body 56 that is generally planar and rectangular in shape. The plate body 56 is of a physical dimension adequate to cover the front wall 28 of the main body 24. The cover 54 may include a plurality of raised elements 58 on a rear face of the plate body 56. The cover 54 may include indicia 59 on a front face of the plate body 56 as illustrated in FIG. 1B, which is visible to an observer positioned behind the motor vehicle upon which the trailer hitch cover assembly 10 is installed. It should be appreciated that, in other embodiments, the indicia 59 may take any form of graphic or illustrative representation for decorative purposes. It should also be appreciated that, in other embodiments, other methods or types of imprinting a decorative image onto or into the front face of the plate body 56 may be used other than molding.

The cover 54 also has a hinge knuckle 60 with a hinge pin bore 62 extending axially therethrough. The hinge knuckle 60 extends outwardly from a bottom of the plate body 56. The hinge knuckle 60 is disposed between the hinge knuckles 33 such that the hinge pin bore 62 is aligned with the apertures 34. The cover 54 is connected to the main body 24 by a hinge pin 64 extending through the apertures 34 and hinge pin bore 62 as illustrated in FIG. 1B. The cover 54 is rotatable via the hinge pin 64 between a closed position, where a rear face of the plate body 56 is in full contact with a front face of the main body 24, and an open position, where the cover 54 is rotated downward away from the main body 24, allowing access to the interior of the hitch tube 14. The cover 54 may be urged into the closed position by a spring (not shown) connected to the hinge pin 64. The cover 54 is made of a rigid material such as metal, plastic, or a metal with a plastic overlay. It should also be appreciated that the trailer hitch cover assembly 10 may include a roller (not shown) connected to the hinge pin 64 to eliminate dragging or scraping on pavement due to a steep embankment.

In operation, the trailer hitch cover assembly 10 is installed on the end of the hitch tube 14 by first orienting the side walls 46 of the insulating member 40 with the sidewalls 27 of the main body 24 with the sidewalls of the hitch tube 14. The sidewalls 46 and 27 are slid back over the sides of the hitch tube 14. The tabs 31a are deflected laterally and outwardly by the flange 17 around the open end of the hitch tube 14 and return to their undeflected position once past the flange 17. The sidewalls 46 and 27 are slid further back until the apertures 29 and 49 align with the lockpin apertures 21 of the hitch tube 14. The trailer hitch cover assembly 10 is retained upon the end of the hitch tube 14 by the tabs 31a in the sidewalls 27 of the main body 24 resting behind the flange 17 surrounding the open end of the hitch tube 14. The tabs 31a engage the back or rear surface of the flange 17 of the hitch tube 14. The trailer hitch cover assembly 10 is thereby retained on the end of the hitch tube 14 and will not fall off during usage. It should be appreciated that the trailer hitch cover assembly 10 may be removed with the use of tools to lift the tabs 31a, but it is not so easily removable as to be a ready target for theft.

With the trailer hitch cover assembly 10 installed on the open end of the hitch tube 14, the cover 54 will initially be in the closed position, which provides a sealed protective covering for the opening of the cavity 15 of the hitch tube 14. When the hitch tube 14 is needed for towing, the cover 54 may be rotated downward from the front face of the main body 24, thereby exposing the apertures 32 and 52 of the main body 24 and insulating member 40, respectively. The insert tube 16 is inserted through the apertures 32 and 52 and into the cavity 15 of the hitch tube 14. The insert tube 16 is secured in the hitch tube 14 by inserting the lockpin 22 through the apertures 29 and 49 of the trailer hitch cover assembly 10 and the lockpin apertures 21 of the hitch tube 14 and the lockpin apertures 20 of the insert tube 16 as previously described. The lock pin 22 is then secured by the hairpin clip 23. The cover 54 may be left to lie against the bottom of the insert tube 16. It should be appreciated that the lockpin 22 may be removed and the insert tube 16 removed and the cover 54 rotated to the closed position to protect the hitch tube 14 when not in use.

Figure 5B:
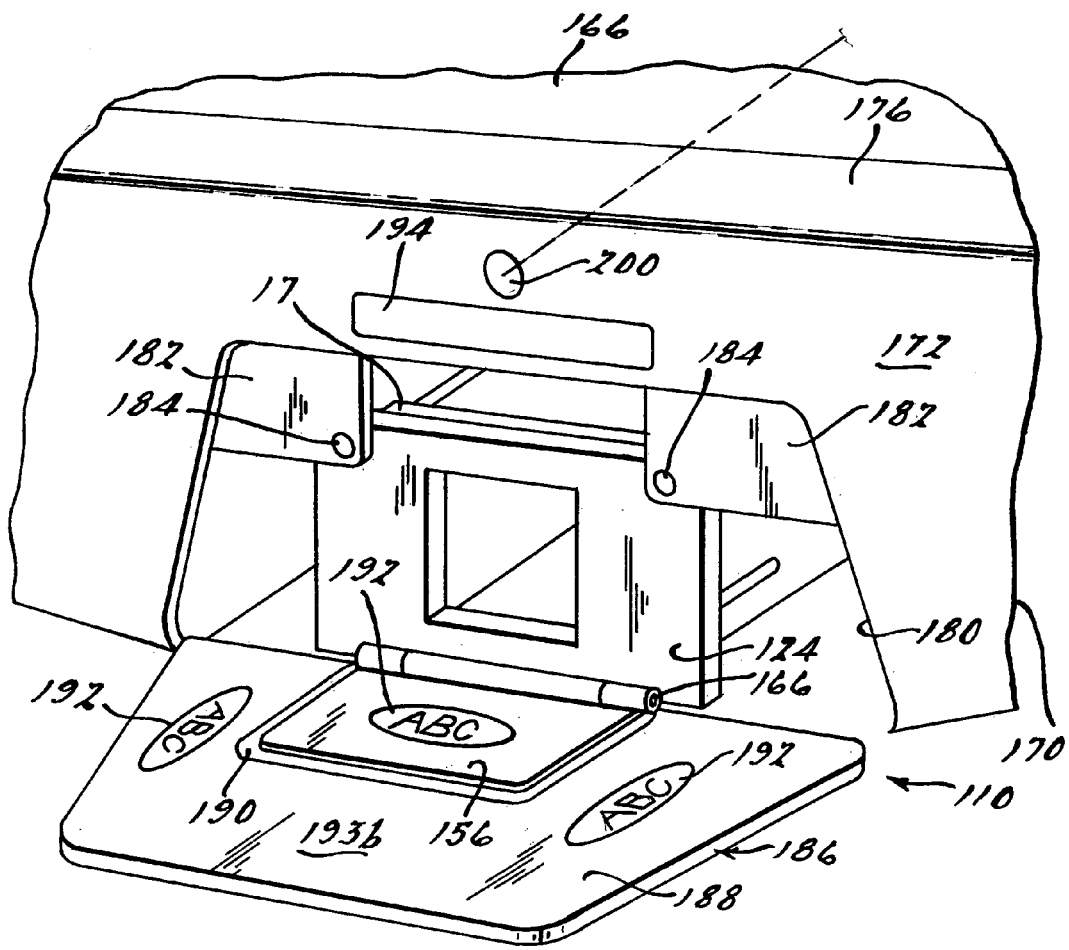
FIG. 5B is an enlarged perspective view of a portion of the trailer hitch cover assembly of FIG. 5A with the cover illustrated in an open position.
Figure 5A:
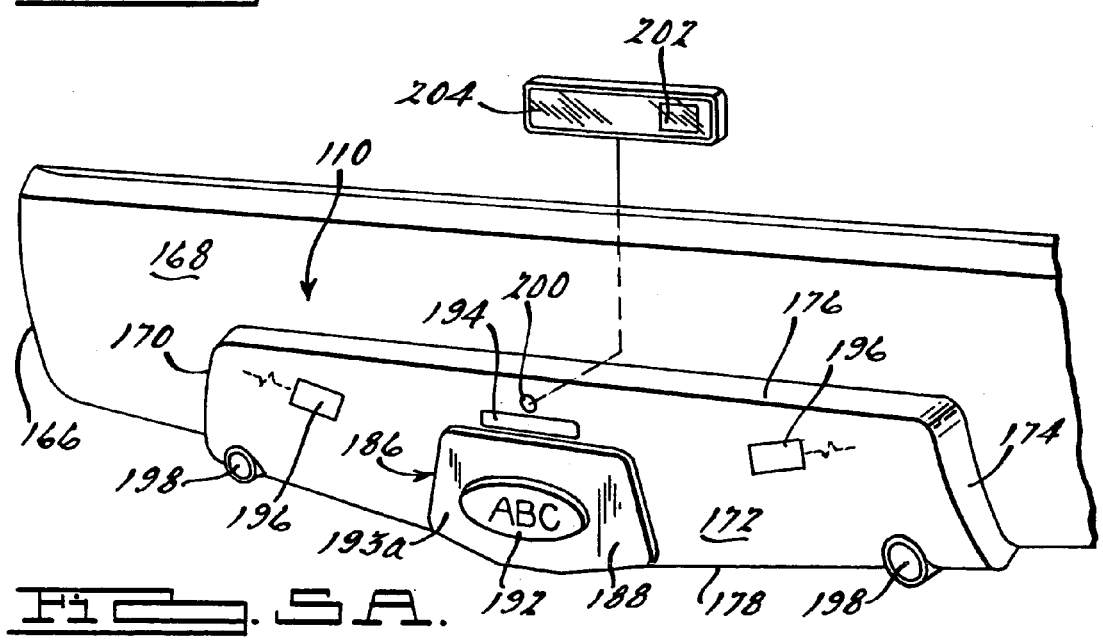
FIG. 5A is a perspective view of another embodiment, according to the present invention, of the trailer hitch cover assembly illustrated with a cover in a closed position and in operational relationship with a conventional hitch tube and bumper fascia of a motor vehicle.

Referring to FIGS. 5A and 5B, another embodiment, according to the present invention, of the trailer hitch cover assembly 10 is shown. Like parts of the trailer hitch cover assembly 10 have like reference numerals increased by one hundred (100). In this embodiment, the trailer hitch cover assembly 110 covers a portion of a bumper fascia 166, preferably a rear bumper fascia at the rear end of the motor vehicle 12. The bumper fascia 166 has a base wall 168 extending transversely. The base wall 168 is generally rectangular in shape. The bumper fascia 166 also has opposed side walls (not shown) extending longitudinally from the base wall 168 for connection to a vehicle body (not shown) of the motor vehicle. It should be appreciated that the bumper fascia 166 has a top wall (not shown) and bottom wall (not shown) extending generally perpendicularly from the base wall 168 and side walls for covering the rear bumper (not shown).

The trailer hitch cover assembly 110 includes a trim fascia 170 for covering a portion of the bumper fascia 166. The trim fascia 170 has a base wall 172 extending laterally. The base wall 172 is generally rectangular in shape. The trim fascia 170 also has opposed side walls 174 extending longitudinally from the base wall 172. The trim fascia 170 also has a top wall 176 and bottom wall 178 extending generally perpendicularly from the base wall 172 and side walls 174.

The trim fascia 170 also has an aperture 180 extending longitudinally through the base wall 172. The aperture 180 is generally rectangular or trapezoidal in shape. The trim fascia 170 also has at least one, preferably a pair of opposed flange walls 182 spaced laterally and extending laterally into the aperture 180 for a function to be described. The trim fascia 170 is made of a plastic material such as Thermo Plastic Olefin (TPO). The trailer hitch cover assembly 110 may include additional strengthening materials added within the trim fascia 170. These strengthening materials may include, but are not limited to, honeycomb or polymer foams, such as "Terocore" foam by Henkel Surface Technologies, or SAF Stabilized Aluminum Foam by Cymat Automotive, Canada. It should be appreciated that the trim fascia 170 is a monolithic structure being integral, unitary, and formed as one-piece.

The trailer hitch cover assembly 110 also includes at least one, preferably a plurality of fasteners 184 to secure the trim fascia 170 to the main body 124. The fasteners 184 are of a screw type and extend through apertures (not shown) in the flange walls 182. The fasteners 184 engage the front wall 128 of the main body 124 to secure the trim fascia 170 to the main body 124. It should be appreciated that the main body 124 is secured to the hitch tube 14 as previously described. It should also be appreciated that the fasteners 184 are conventional and known in the art.

The trailer hitch cover assembly 110 further includes a cover assembly, generally indicated at 186. In one embodiment, the cover assembly 186 includes a rotatable door or cover plate 156 and a fascia plate 188. The fascia plate 188 is generally planar and trapezoidal or rectangular in shape. The fascia plate 188 includes a raised portion 190 that is secured to the cover plate 156 by suitable means such as welding. The fascia plate 188 is made of a rigid material such as metal or plastic. The cover plate 156 covers the front of the main body 124 when the insert tube 16 is removed from the cavity 15 of the hitch tube 14 in a closed position. The fascia plate 188 covers the aperture 180 of the trim fascia 170 when the insert tube 16 is removed from the cavity 15 of the hitch tube 14 in a closed position. The fascia plate 188 may include indicia 192 on a front face 193a thereof, which is visible to an observer positioned behind the motor vehicle upon which the trailer hitch cover assembly 110 is installed. The cover plate 156 and the fascia plate 188 may include the indicia 192 on a rear face 193b thereof, which is visible to an observer when the fascia plate 188 is open and the insert tube 16 is inserted into the hitch tube 14. It should be appreciated that the indicia 192 may take any form of graphic or illustrative representation for decorative purposes. It should be appreciated that fascia plate 188 is purely aesthetic and the structural strength of the cover assembly 186 properly lies with the cover plate 156. It should be appreciated that the cover assembly 186 is rotatable via the hinge pin 166 between a closed position and an open position, allowing access to the cavity 15 of the hitch tube 14. It should also be appreciated that the cover assembly 186 may be urged into the closed position by a spring (not shown) connected to the hinge pin 166.

The trailer hitch cover assembly 110 may include one or more lights integrated into the trim fascia 170 as shown in FIG. 5A. In one embodiment, the trailer hitch cover assembly 110 may include a brake light 194 connected to the trim fascia 170 and to a source of power (not shown) of the motor vehicle. Preferably, the brake light 194 is located above the cover assembly 186. In the same or another embodiment, the trailer hitch cover assembly 110 may include at least one, preferably a plurality of reverse back-up lights 196 operatively supported by or connected to the trim fascia 170 and to a source of power (not shown) of the motor vehicle. Preferably, the back-up lights 196 are located laterally of the cover assembly 186.

The trailer hitch cover assembly 110 may include one or more sensors integrated into the trim fascia 170 as shown in FIG. 5A. In one embodiment, the trailer hitch cover assembly 110 includes at least one, preferably a pair of back-up or positional sensors 198 operatively supported by or connected to the trim fascia 170 and to a source of power (not shown) of the motor vehicle. Preferably, the sensors 198 are located laterally of the cover assembly 186. The sensors 198 can provide various auditory clues in the form of tones or speech relating the approximate closing distance. These sensors 198 may also be installed directly on the sides of the trailer hitch cover assembly 110, so that they are fully covered and protected when the cover assembly 186 is in the closed position. To interconnect the sensors 198 within the motor vehicle to their respective display and output devices, the sensors 198 may be hardwired or may incorporate a wireless technology, such as "bluetooth".

The trailer hitch cover assembly 110 may include one or more cameras integrated into the trim fascia 170 as shown in FIG. 5A. In one embodiment, the trailer hitch cover assembly 110 includes at least one miniature video camera 200 disposed within or connected to the trim fascia 170 and to a source of power (not shown) of the motor vehicle. The camera 200 provides the driver/operator with visual clues as to the location of the motor vehicle in relationship to the object to be towed. As the motor vehicle is being backed toward a trailer, or the like, the camera 200 provides a video signal to a display 202 located in a rearview mirror 204 within an occupant compartment of the motor vehicle. The display 202 is preferably of an LED type, which is ON in "Reverse" and OFF in "Drive" modes. It should be appreciated that the display 202 may be similar to a color television. It should also be appreciated that the sensors 198 and cameras 200 are optional and may be disposed at other locations on the motor vehicle.

The trailer hitch cover assembly 110 may include a drop pan (not shown) integrated into the trim fascia 170 and disposed below the cover assembly 186. The drop pan is hinged and latched to the main body portion 124. It should be appreciated that the main body portion 124 may have an exterior face made of an elastomeric material such as rubber.

Referring to FIG. 6, yet another embodiment, according to the present invention, of the trailer hitch cover assembly 10 is shown. Like parts of the trailer hitch cover assembly 10 have like reference numerals increased by two hundred (200). In this embodiment, the trailer hitch cover assembly 210 includes a trim fascia 270 similar to the trim fascia 170 of the trailer hitch cover assembly 110. The trailer hitch cover assembly 210 also includes a cover assembly 286 similar to the cover assembly 186 of the trailer hitch cover assembly 110. The trailer hitch cover assembly 210 includes a latch 304 mounted to or operatively supported by the trim fascia 270 and extending into the aperture 280 of the trim fascia 270. The trailer hitch cover assembly 210 also includes a striker 305 mounted to the cover assembly 286 for engaging and disengaging the latch 304 in a closed and open position, respectively. The latch 304 may be connected to a source of power to be activated by a wireless transmitter or key fob 306 to unlatch the striker 305 from the latch 304. The latch 304 may also be electrically or mechanically connected to a switch or release 307 disposed within the motor vehicle, for example, adjacent a seat 308. It should be appreciated that the latch 304 is similar to that used for fuel doors on motor vehicles.

Referring to FIGS. 7A and 7B, still another embodiment, according to the present invention, of the trailer hitch cover assembly 10 in shown. In this embodiment, a trim hitch cover assembly 400 is of an add-on, aftermarket type that includes a cover receiver 402, a bonding member 404, a cover plate 406, and a separate trailer hitch cover assembly 10 shown in FIG. 1B. A motor vehicle, generally indicated at 410, is shown. The motor vehicle 410 is of a pick-up truck type having a rear bumper assembly, generally indicated at 412, of the type that incorporates a trailer hitch assembly 12 that is generally exposed to the elements. In this embodiment, the cover receiver 402 is securely attached to the rear bumper assembly 412 of the motor vehicle 410 by the bonding member 404. Preferably, the bonding member 404 is of a two-sided adhesive tape commercially available from 3M Corporation of Minnesota. It should be appreciated that the bonding member 404 may be made of a variety of adhesive or bonding materials that allows the installer to readily locate and adhere the cover receiver 402 to the rear bumper assembly 412 of the motor vehicle 410. In one embodiment, the cover plate 406 and the cover receiver 402 are of the same approximate dimensions and are operatively joined in a hinged manner about their upper longitudinal edges. In another embodiment, the cover plate 406 and the cover receiver 402 may also be alternately hinged about a lower longitudinal edge so that the cover plate 406 folds downward to its open position. However, being of an add-on construction affixed only by the bonding member 404, this embodiment is generally of an insufficient structural foundation to provide a step as in the other embodiments of the present invention.

The cover receiver 402 has an open center area 414 that allows through access to the trailer hitch assembly 12 when the trailer hitch cover assembly 400 is affixed to the motor vehicle 410 and the cover plate 406 is in the open position, as illustrated in FIG. 7B. It should be appreciated that the cover receiver 402 may also have an open center area 414 to offer a weight and material savings effect.

The cover plate 406 is disposed upon the cover receiver 402. The cover plate 406 may be disposed upon the cover receiver 402 in any of a variety of manners, such as adhesive, or clips. In another embodiment, the cover receiver 402 may also incorporate an internal groove (not shown) in which the cover plate 406 slides down into and is thereby retained. In this embodiment, it is also possible that a vehicle license plate be relocated and substituted for the cover plate 406. If the cover plate 406 is used, it may also include indicia 416 on its front face, which would be visible to an observer positioned behind the motor vehicle 410 upon which the trim hitch cover assembly 400 is installed. It should be appreciated that, as in other embodiments, the indicia 416 may take any form of graphic or illustrative representation for decorative purposes. It should also be appreciated that a separate trailer hitch cover assembly 10, like that previously described, is installed on the hitch tube 14 of the trailer hitch 12 to provide complete protection from the elements.

Referring to FIG. 8, a further embodiment, according to the present invention, of the trailer hitch cover assembly 10 is shown. In this embodiment, a trim hitch cover assembly 500 is shown for a rear bumper assembly, generally indicated at 512, of the type that incorporates a trailer hitch assembly 12 that is generally exposed to the elements. In this embodiment, the trim hitch cover assembly 500 has a pair of hinge assemblies 514 that are used to allow a cover plate 516 to move between a closed and an open position. In this manner, the cover plate 516 covers and protects the hitch tube 14 or a separate trailer hitch cover assembly (not shown) may be concomitantly installed over the end of the hitch tube 14 as shown in FIG. 1B. The trim hitch module assembly 500 may include a bracket 518 to strengthen a rear bumper fascia 520 of the rear bumper assembly 512, if required by the application. In this embodiment, the trim hitch cover assembly 500 may include an actuator 522 disposed within the rear bumper assembly 512. Preferably, the actuator 522 includes a motor 524 and a locking pin 526 cooperating with the motor 524 and one of the hinge assemblies 514. The locking pin 526 engages and disengages at least one aperture 528 in the hinge assembly 514. When the locking pin 526 engages the aperture 528, the cover plate 516 is held in the open position. In this manner, the actuator 522 is operative to open and close the cover plate 516. It should be appreciated that the motor 524 may be electrically wired as to allow remote operation of the actuator 522. It should also be appreciated that the actuator 522 may be used with either hinge assembly 516.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trailer hitch cover assembly comprising:
a bumper fascia for attachment to a motor vehicle having an aperture for allowing a hitch tube to extend therethrough;
a main body adapted to be disposed over the hitch tube and mounted to said bumper fascia, said main body adapted to allow insertion of a hitch into the hitch tube; and
a cover plate hingedly connected to said main body for moving between a closed position to close said aperture to conceal the hitch tube and an open position to open said aperture to expose the hitch tube.

2. A trailer hitch cover assembly as set forth in claim 1 wherein said main body comprises a front face having an opening extending longitudinally therethrough to allow insertion of the hitch into the hitch tube.

3. A trailer hitch cover assembly comprising:
a bumper fascia for attachment to a motor vehicle having an aperture for allowing a hitch tube to extend therethrough;
a main body adapted to be disposed over the hitch tube and adapted to allow insertion of a hitch into the hitch tube, said main body including at least one deflectable tab for retaining said main body on the hitch tube; and
a cover plate hingedly connected to either one of said main body and said bumper fascia for moving between a closed position to close said aperture to conceal the hitch tube and an open position to open said aperture to expose the hitch tube.

4. A trailer hitch cover assembly as set forth in claim 3 including at least one hinge member operatively supported by said bumper fascia to hingedly connect said cover plate to said bumper fascia.

5. A trailer hitch cover assembly comprising:
a bumper fascia for attachment to a motor vehicle having an aperture for allowing a hitch tube to extend therethrough;
a main body adapted to be disposed over the hitch tube and adapted to allow insertion of a hitch into the hitch tube, said main body further comprises at least one aperture extending transversely therethrough to allow passage of a lock pin to secure said main body to the hitch tube; and
a cover plate hingedly connected to either one of said main body and said bumper fascia for moving between a closed position to close said aperture to conceal the hitch tube and an open position to open said aperture to expose the hitch tube.

6. A trailer hitch cover assembly as set forth in claim 1 including a fascia plate operatively supported by said cover plate.

7. A trailer hitch cover assembly as set forth in claim 6 including indicia on a front face of said fascia plate.

8. A trailer hitch cover assembly as set forth in claim 6 including indicia on a rear face of either one of said fascia plate and said cover plate.

9. A trailer hitch cover assembly comprising:
a bumper fascia for attachment to a motor vehicle having an aperture for allowing a hitch tube to extend therethrough;
a main body adapted to be disposed over the hitch tube and adapted to allow insertion of a hitch into the hitch tube; and
a cover plate hingedly connected to either one of said main body and said bumper fascia for moving between a closed position to close said aperture to conceal the hitch tube and an open position to open said aperture to expose the hitch tube; and
a trim fascia operatively supported by said main body for covering a portion of said bumper fascia.

10. A trailer hitch cover assembly as set forth in claim 9 including at least one sensor operatively supported by said trim fascia.

11. A trailer hitch cover assembly as set forth in claim 9 including at least one light operatively supported by said trim fascia.

12. A trailer hitch cover assembly as set forth in claim 11 including a display connected to said at least one camera.

13. A trailer hitch cover assembly as set forth in claim 12 wherein said display is located in a rearview mirror.

14. A trailer hitch cover assembly as set forth in claim 9 including at least one camera operatively supported by said trim fascia.

15. A trailer hitch cover assembly as set forth in claim 9 including a latch operatively supported by said trim fascia.

16. A trailer hitch cover assembly as set forth in claim 9 including a striker operatively supported by said cover plate to engage and disengage said latch.

17. A trailer hitch cover assembly for a motor vehicle having a bumper and a hitch tube comprising:
a main body adapted to be disposed over the hitch tube and adapted to allow insertion of a hitch into the hitch tube;
a cover receiver connected to said bumper; and
a cover plate hingedly connected to said cover receiver for moving between a closed position to conceal the hitch tube and an open position to expose the hitch tube.

18. A trailer hitch cover assembly as set forth in claim 17 including a bonding member disposed between said cover receiver and said bumper.

19. A trailer hitch cover assembly as set forth in claim 4 including a locking pin cooperating with said at least one hinge member.

20. A trailer hitch cover assembly for a motor vehicle comprising:
a trim fascia for covering a portion of a bumper fascia of a motor vehicle having an aperture for allowing a hitch tube to extend therethrough;
a main body adapted to be disposed over the hitch tube and adapted to allow insertion of a hitch into the hitch tube;
a cover plate hingedly connected to said main body for moving between a closed position to close the hitch tube and an open position to open the hitch tube to allow insertion of the hitch into the hitch tube; and
a fascia plate operatively supported by said cover plate for moving between a closed position to close said aperture to conceal the hitch tube and an open position to open said aperture to expose the hitch tube.

\* \* \* \* \*